United States Patent
Bergmann et al.

(10) Patent No.: US 6,577,399 B1
(45) Date of Patent: Jun. 10, 2003

(54) OPTICAL WAVEGUIDE BASED POWER AND WAVELENGTH MONITOR

(75) Inventors: Ernest E. Bergmann, Fountain Hill, PA (US); Gail A. Bogert, Bethlehem, PA (US)

(73) Assignee: Triquing Technology Holding Co., Hillsboro, OR (US)

( * ) Notice: Subject to any disclaimer, the term of this patent is extended or adjusted under 35 U.S.C. 154(b) by 0 days.

(21) Appl. No.: 09/535,416

(22) Filed: Mar. 24, 2000

(51) Int. Cl.⁷ .............................. G01B 9/02; H04B 10/04
(52) U.S. Cl. ..................... 356/477; 356/451; 359/182
(58) Field of Search .................. 356/477, 451, 356/453, 450; 359/180, 182

(56) References Cited

U.S. PATENT DOCUMENTS

| | | | |
|---|---|---|---|
| 5,426,502 A | * 6/1995 | Miyata et al. | .............. 356/477 |
| 5,583,683 A | 12/1996 | Scobey | |
| 5,745,275 A | 4/1998 | Giles et al. | |
| 5,850,292 A | 12/1998 | Braun | |
| 5,969,834 A | 10/1999 | Farber et al. | |

* cited by examiner

*Primary Examiner*—Samuel A. Turner
*Assistant Examiner*—Patrick Connolly
(74) *Attorney, Agent, or Firm*—Duane Morris LLP

(57) ABSTRACT

A method and apparatus may be used to determine the wavelength of an input optical signal. The wavelength of an input optical signal may be determined by dividing the input optical signal into a plurality of individual optical signals and inducing the individual optical signals to interfere with each other to form a plurality of output optical signals, such that the powers of the output optical signals have a ripple dependence on the wavelength of the input optical signal. The peak amplitude of each of the powers depends monotonically on the wavelength of the input optical signal over a range of wavelengths to be monitored for said input optical signal. A plurality of electrical output signals may be produced from the output optical signals, each electrical output signal corresponding to the power of each output optical signal. The electrical output signals may then be compared to a predetermined set of signal values in order to determine the wavelength of the input optical signal. A monitor employing this method may easily be incorporated into a telecommunications system.

34 Claims, 6 Drawing Sheets

OPTICAL WAVEGUIDE BASED POWER AND WAVELENGTH MONITOR

FIELD OF THE INVENTION

The present invention is related to power and wavelength monitoring for an optical signal, and more specifically to a method and apparatus for monitoring the wavelength and power of an optical laser used in telecommunication applications.

DESCRIPTION OF THE RELATED ART

Dense Wavelength Division Multiplexing (DWDM) of optical signals has become a popular method for increasing bandwidth over existing fiber optic backbones. In DWDM systems, multiple signal sources which generate signals of different wavelengths share the same fiber transport system. In effect, the DWDM technology allows a single fiber to function as a plurality of fibers. These signal sources, for example, often share the same optical fiber with spacing between individual channel assignments of only 100 GHz, 50 GHz, or even less, within the 1528 to 1565 nm wavelength range defined by the main gain region of an erbium doped fiber amplifier (EDFA), a typical component of a modern telecommunication system. Assuming this wavelength operating range, the spacing between these source signals is only approximately 0.8 nm, 0.4 nm, or even less.

Semiconductor lasers are commonly used as the signaling sources for telecommunication systems utilizing optical signals. A typical semiconductor laser may be operated in a range of wavelengths depending upon its operating current and temperature. Even at a fixed temperature and current, it is expected that over time, e.g. several years, the wavelength of the light emitted from the laser will gradually shift or drift from the desired operating wavelength to a wavelength that is no longer suitable for the signal's particular wavelength channel assignment. This shifting or drifting is particularly a problem in systems using DWDM because of the narrow channel assignments for each signal. It should also be noted that the power output of the laser can vary over time, often by as much as a factor of ten over approximately a decade of use. By observing the wavelength shift or drift, a laser's performance may be corrected by adjusting the temperature and/or current of the semiconductor laser to maintain the semiconductor laser at a desired operating wavelength and power.

Monitoring the wavelength and power of these optical signals, therefore, has become increasingly important as wavelength spacing decreases. Wavelength monitoring can be performed by optical spectrum analyzers that rely on motors to rotate optical gratings or optical filter elements. These devices, however, are often cumbersome when integrated into an optical telecommunication system. Other smaller optical spectrum analyzers suffer from cost restraints. Monitors have been proposed that may be integrated into telecommunication systems, such as U.S. Pat. No. 5,850,292 to Braun for a "Wavelength Monitor For Optical Signals," the entirety of which is incorporated herein by reference, but it is still desirable to have an optical wavelength and power monitor that may be integrated into an optical telecommunication system in a cost-effective manner which has a large range over which there is no ambiguity of wavelength and power for an input optical signal.

SUMMARY OF THE INVENTION

The present invention is a method and apparatus for determining the wavelength and power of an input optical signal. The wavelength of an input optical signal is determined by dividing the input optical signal into a plurality of individual optical signals and inducing the individual optical signals to interfere with each other to form a plurality of output optical signals. The powers of the output optical signals have a ripple dependence on the wavelength of the input optical signal and the peak amplitude of each of the powers depends monotonically on the wavelength of the input optical signal over a range of wavelengths to be monitored for the input optical signal. The output optical signals are detected, and a plurality of electrical output signals corresponding to the power of each output optical signal, respectively, are produced. The electrical output signals are compared to a predetermined set of signal values, and the wavelength of the input optical signal is determined from the comparison.

By observing a plurality of outputs, the method permits the determination of the wavelength of an input optical signal without relying on the accuracy of a single output. More individual wavelengths may be resolved than different electrical levels at any one output. Further, the wavelength range for which the wavelength of an input optical signal may be determined is expanded because the peak amplitude of each of the powers of the output optical signals depends monotonically on the wavelength of the input optical signal over a range of wavelengths to be monitored for the input optical signal.

An apparatus that may be used to determine the wavelength of an input optical signal according to the present invention includes at least one optical signal divider for dividing the input optical signal into a plurality of individual optical signals, a plurality of optical paths having different optical path lengths disposed such that the individual optical signals propagate through the optical paths, and at least one output coupler. The output coupler accepts a plurality of the individual optical signals after the individual optical signals propagate through the optical paths and permits the individual optical signals to interfere with each other to form a plurality of output optical signals. The powers of the output optical signals have a ripple dependence on the wavelength of the input optical signal. The apparatus also includes at least one slow wavelength dependent coupler and a plurality of optical detectors. The optical detectors are disposed to detect the output optical signals. The slow wavelength dependent coupler causes the peak amplitude of each of the powers to depend monotonically on the wavelength of the input optical signal over a range of wavelengths to be monitored for the input optical signal, and the optical detectors produce a plurality of electrical output signals corresponding to the power of each output optical signal, respectively. The apparatus also includes a means for comparing the electrical output signals to a predetermined set of signal values and a means for determining the wavelength of the input optical signal from the comparison.

The apparatus according to the present invention may be integrated into an optical transmitter system, such as a transmitter system of a telecommunication system utilizing DWDM, in a cost-effective manner while maintaining a large range over which there is no ambiguity of wavelength and power for an input optical signal.

The above and other features of the present invention will be better understood from the following detailed description of the preferred embodiments of the invention which is provided in connection with the accompanying drawings.

DETAILED DESCRIPTION

Figure 1:
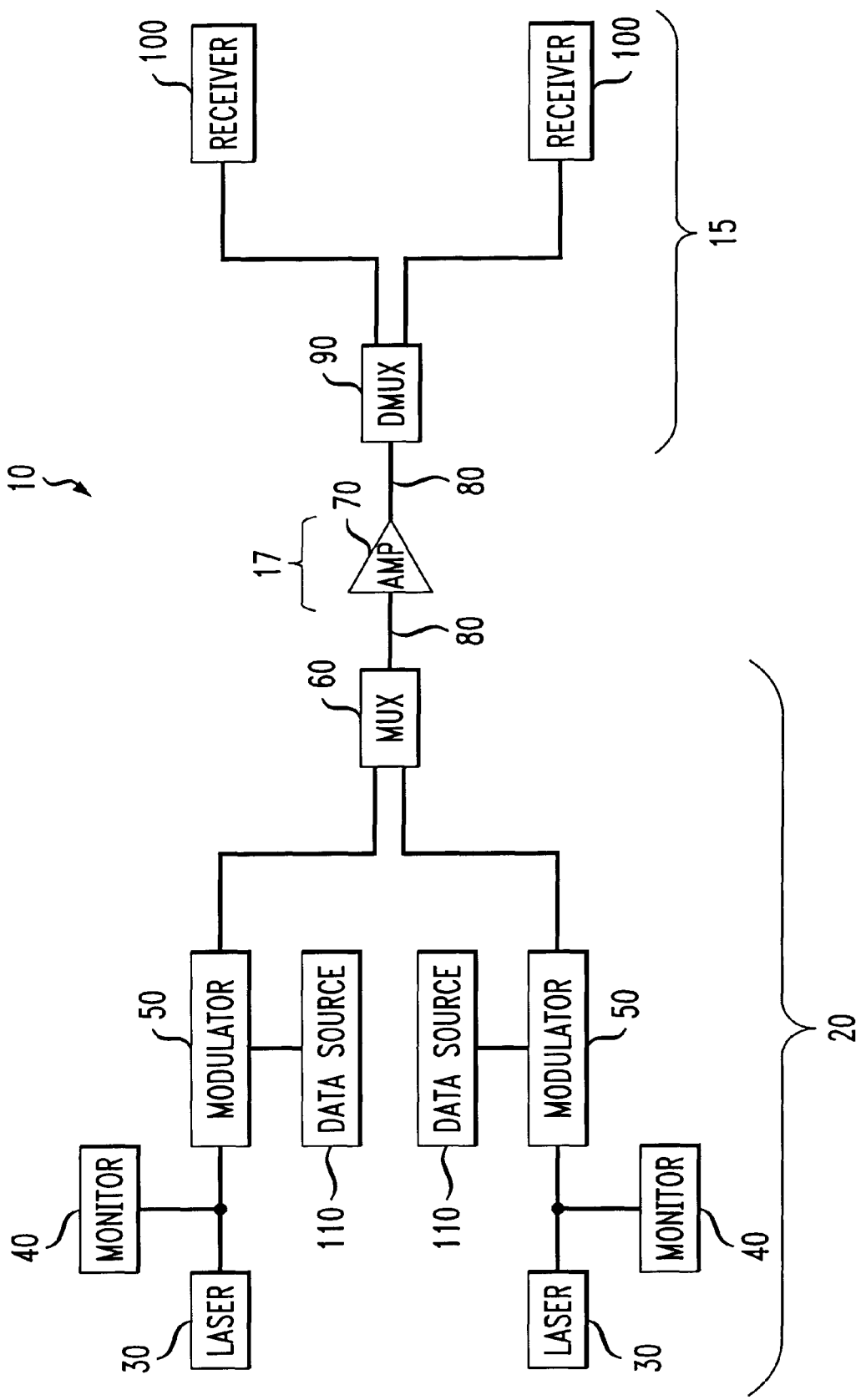
FIG. 1 is a block diagram of a telecommunication system.

FIG. 1 is a diagram of a telecommunication system 10 including an input optical transmitter system 20, a transmission system 17, and a receiver system 15. The input optical transmitter system 20 includes a plurality of optical lasers 30. Each laser 30 generates an optical signal of a particular wavelength. A laser 30 may be connected to modulator 50, or a modulation function may be included in laser 30. The optical signal generated by laser 30 is modulated with data generated by data source 110. A plurality of modulated optical signals are multiplexed by multiplexer 60 into a multiplexed signal for transmission. The multiplexed signal may be, for example, a Dense Wavelength Division Multiplexed (DWDM) signal. A plurality of optical signals, each having different wavelengths, may be transmitted by transmission system 17 over a single transmission line 80 in this manner. Transmission line 80 may be an optical fiber or other optical transmission medium.

The multiplexed signal is often amplified at predetermined distances in the transmission system 17 by at least one amplifier 70. This amplifier is commonly an erbium doped fiber amplifier (EDFA). The multiplexed signal may be demultiplexed by DMUX 90 after transmission in a receiver system 15. An individual optical signal transmitted as a component of the multiplexed signal may then be demodulated or otherwise processed by a receiver 100. A telecommunication system 10 may include a plurality of transmission lines 80, multiplexers 60, and demultiplexers 90 as optical signals are routed to different destinations. For example, an individual component signal of a multiplexed signal could be removed from a multiplexed signal at a DMUX 90 and the remainder of the multiplexed signal could be transmitted to another destination, or even multiplexed with another signal.

The input optical transmitter system 20 may include at least one monitor 40. The monitor 40 may be used to determine the wavelength and power of an optical signal generated by laser 30. The monitor 40 is preferably disposed to accept an input optical signal before the optical signal is modulated since a modulated optical signal contains extraneous information, i.e., the data generated by data source 110. The monitor 40 may be integrated into the input optical transmitter system by using a tap device to extract a known portion of an optical signal generated by an optical laser 30. The portion extracted by the tap is known from the tap ratio for the tap and may be wavelength dependent. The method by which monitor 40 may determine the wavelength and power of an input optical signal is described hereafter in conjunction with two exemplary embodiments of the monitor 40.

Figure 2:
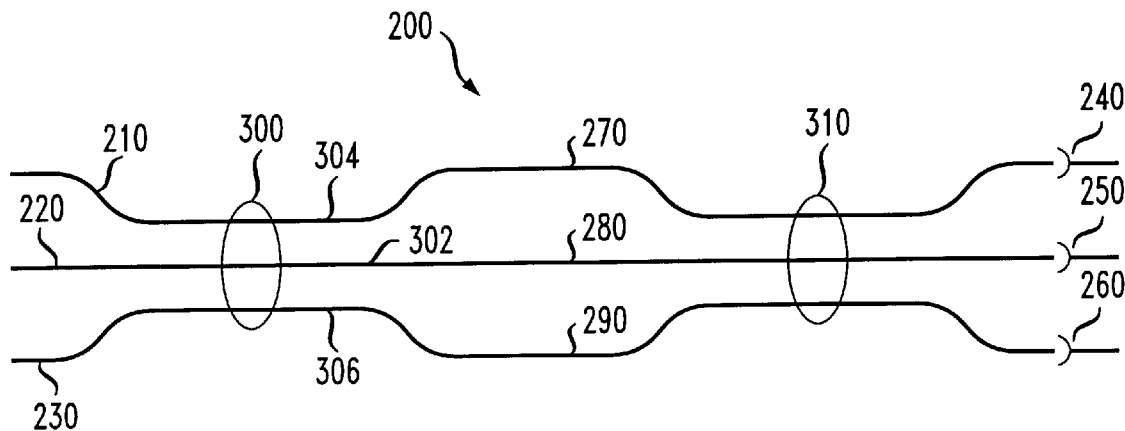
FIG. 2 is a diagram of an exemplary lightwave circuit having three optical outputs according to the present invention.

FIG. 2 is a diagram of an exemplary embodiment of a lightwave circuit 200 that may be included in an apparatus, such as monitor 40, for determining the wavelength and power of an input optical signal. In FIG. 2 and other diagrammatical representations of lightwave circuits described herein, waveguides are designated as lines, such as lines designated at numbers 304, 302, 306, 210, 220, and 230 in FIG. 2. Lightwave circuit 200 includes an optical signal divider which may be coupler 300. The loop shown at coupler 300 (and coupler 310 and coupler 450, 460 of FIG. 4) designates a regions where the waveguides 304, 302, 306 are close enough to couple light between themselves. A first optical input 210, a second optical input 220, and a third optical input 230 are shown connected to coupler 300. Although three optical inputs 210, 220, 230 are shown, only optical input 220 accepts an input optical signal. The input optical signal may be that portion of an optical signal generated by a laser 30 that is tapped as an input to monitor 40, as shown in FIG. 1.

An input optical signal inputted at second optical input 220 is divided into three individual optical signals as it propagates through optical coupler 300. As an input optical signal propagates through optical coupler 300, some of the input optical signal leaks or disperses from the center waveguide or channel 302 into the side waveguides or channels 304, 306 of optical coupler 300. Essentially, the power of the input optical signal is divided between the individual optical signals within coupler 300, typically in an uneven distribution.

A plurality of optical paths 270, 280, 290 having different optical path lengths may be connected to the output of optical coupler 300, specifically to channels 304, 302, 306, respectively. The optical paths 270, 280, 290 are connected to an output coupler 310 that accepts the individual optical signals after the individual optical signals propagate through the optical paths 270, 280, 290. The individual optical signals, having propagated through optical paths of different optical lengths, interfere with each other within output coupler 310 to form a first output optical signal, a second output optical signal, and a third output optical signal. The output optical signals may be detected at a first optical detector 240, a second optical detector 250, and a third optical detector 260. The optical detectors are preferably photodetectors, such as photodiodes. At least one of the optical couplers 300, 310 is characterized by a slow wavelength dependency on the wavelength of the input optical signal accepted at second optical input 220. This slow wavelength dependency is explained hereafter in connection with a simulation of a preferred embodiment of the lightwave circuit 200. The simulation is a mathematical simulation showing the expected powers of the output optical signals from the lightwave circuit 200 as the wavelength of the input optical signal is increased.

In the preferred embodiment, the path length difference between the first optical path 270 and third optical path 290 is a fraction of a wavelength. In the simulation, third optical path 290 is set at 3000 um and first optical path 270 is a quarter of a wavelength longer than third optical path 290. The second optical path 280 is preferably hundreds to thousands of wavelengths different in length than the first and third optical paths 270, 290. The second optical path 280 is set at 2000 um in the simulation. Because of the large difference in path length between the second optical path 280 and the first and third optical paths 270, 290, a rapid fluctuation in the coupling between the input optical signal and the first, second and third output optical signals occurs as a function of the wavelength of the input optical signal, i.e., as the wavelength of the input optical signal varies. The fluctuation, or ripple dependency on the wavelength of the input optical signal, is illustrated in FIGS. 5 and 6.

Figure 5:
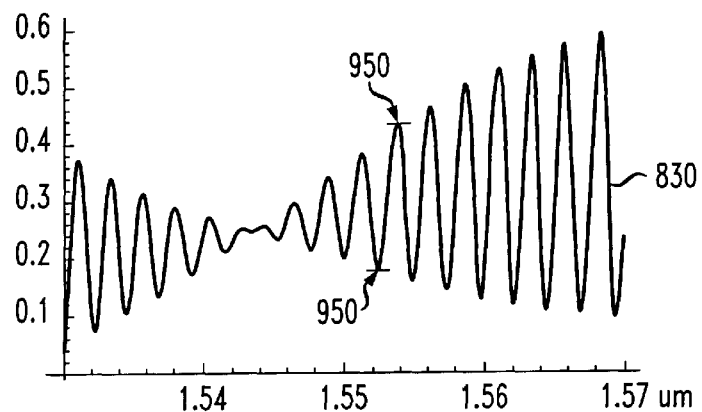
FIG. 5 is a graph of the power of an output optical signal from a simulation of the lightwave circuit of FIG. 2 over a range of wavelengths for an input optical signal.

FIG. 5 is a graph over a range of wavelengths of the power 830 of the second output optical signal. FIG. 5 shows that a ripple in the power 830 of the second output optical signal occurs approximately every 2 nm of wavelength change in the input optical signal when the path length difference between the second optical path 280 and the first and third optical paths 270, 290 is approximately 1000 um. If this difference in path length equals 2000 um (i.e., twice the path length difference), a ripple response in the power of the output optical signal would appear approximately every 1 nm of wavelength change. This ripple response is a manifestation of the interference that occurs in optical coupler 310 between the first, second, and third individual optical signals and which appears in the powers of the first, second, and third output optical signals as the wavelength of the input optical signal changes.

FIG. 5 also shows the slow wavelength dependence of the peak amplitude 950 of the power 830 of the second output optical signal. Because the amount of coupling occurring within coupler 300 and/or output coupler 310 changes slowly with the wavelength of the input optical signal, the peak amplitude 950 of the power 830 of the second output optical signal changes slowly as the wavelength of the input optical signal changes. The peak amplitude of power of an output optical signal showing a ripple dependence on wavelength is designated herein as the peak to peak amplitude difference indicated by numbers 950. The change in peak amplitude 950 is monotonic for at least one range of wavelengths from approximately 1.545 um to 1.57 um (1545 nm to 1570 nm), i.e., the peak amplitude only increases (or decreases) over the given range of wavelength values. This range is helpful because is within the range of wavelengths of an operational erbium doped fiber amplifier. The peak amplitude 950 may also show an oscillatory characteristic, in which case there would be two or more monotonic wavelength ranges for examination, one of which may be used without ambiguity of wavelength and power to monitor optical signals within the range.

Figure 6:
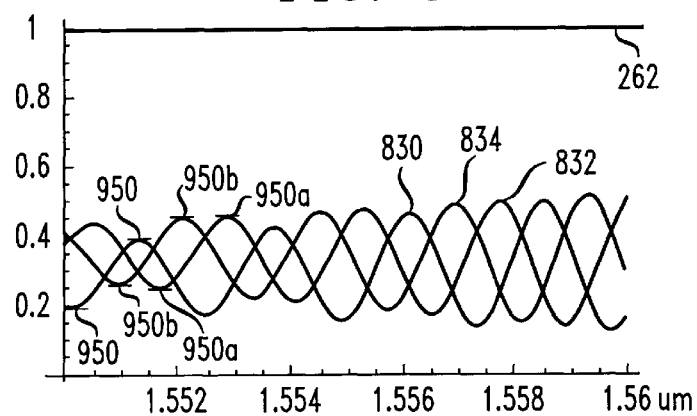
FIG. 6 is a graph of the powers of the three output optical signals from a simulation of the lightwave circuit of FIG. 2 over a range of wavelengths for an input optical signal.

FIG. 6 is a graph over a range of wavelengths of the power 832 of the first output optical signal, the power 830 of the second output optical signal, and the power 834 of the third output optical signal shown as the wavelength of the input optical signal increases. In the simulation, the power of the input optical signal is set at a unitless quantity 1, and it is assumed that there are no losses due to scattering or other forms of loss within the waveguides, i.e., any light entering the second input 220 is expected to exit lightwave circuit 200 and be detected by optical detectors 240, 250, 260. Sum 262 of the powers of output optical signals shows that the total power being detected equals the total power of the input optical signal regardless of the wavelength of the input optical signal. Also, as can be seen in FIG. 6, the powers 832, 830, 834 of the output optical signals display the ripple dependence on the wavelength of the input optical signal. Also, the slow dependence on the change in the wavelength of the input optical signal for the peak amplitudes 950, 950a, 950b of the powers 830, 832, 834 of the output optical signals appears in FIG. 6.

Figure 7:
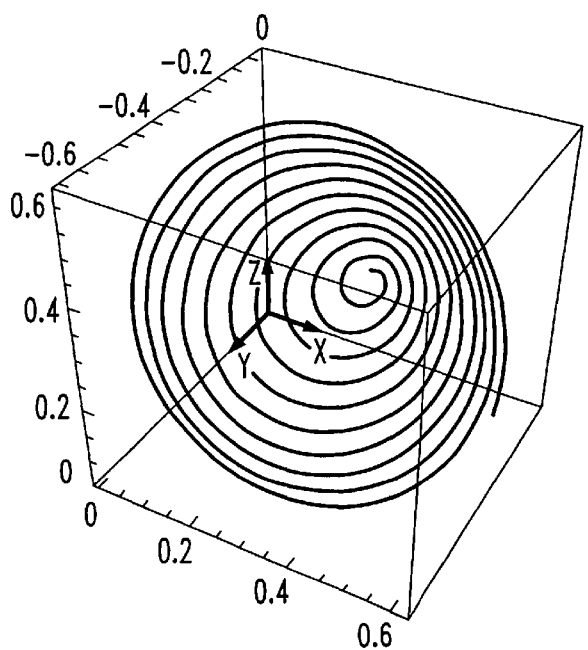
FIG. 7 is a three dimensional graph of the powers of the output optical signals observed from the simulated lightwave circuit of FIG. 2 plotted against each other over a range of wavelengths for an input optical signal.

FIG. 7 demonstrates that when the powers 832, 830, 834 of the output optical signals are plotted against each other when calculated over a range of wavelengths for an input optical signal, specifically the monotonic range of 1.545 um to 1.57 um shown in FIG. 5 where the peak amplitudes 950, 950a, 950b of the ripple dependence of the powers 830, 832, 834 depend monotonically on the wavelength of the input optical signal, it is clear that the curve is a spiral and does not cross itself. This monotonic range of wavelengths may, therefore, be used to monitor lasers 30 designed to operate within the range of wavelengths. In FIG. 7, the power 832 of the first output optical signal is plotted on the X-axis and the power 834 of the third output optical signal is plotted on the Z-axis. The negative of the power 830 of the second output optical signal is plotted on the Y-axis to show a clearer perspective of the resulting curve. Were the curve shown in FIG. 7 to cross itself, there would be two different wavelengths of the input optical signal corresponding to two distances along the spiral line. If two or more wavelengths simultaneously share the same values for the powers of the first output optical signal, second output optical signal, and third output optical signal, there is ambiguity as to the wavelength of the input optical signal. It can be said that there is no ambiguity of wavelength over at least the range of wavelengths used to generate the curve of FIG. 7. Effectively, the slow dependence responsible for the change in peak amplitude of the powers of the output optical signals as the wavelength of the input optical signal changes permits a determination of which power ripple shown in FIG. 5 is being examined. The spiral representation confirms that by using more than one detector, the space of discernible values for examination is increased. Because the number of discernible values has increased considerably, it is possible to distinguish among many more wavelengths without ambiguity where a set of readings not displaying the aforementioned characteristics could lead to different possible wavelength interpretations.

The output optical signals detected by the first optical detector 240, second optical detector 250, and third optical detector 260 may be used to determine the wavelength and power of the input optical signal. The optical detectors 240, 250, 260 are preferably photodetectors. These photodetectors convert a detected output optical signal into an electrical output signal corresponding to the power of the first, second, and third output optical signals, respectively. The electrical output signals may then be compared to a predetermined set of signal values. The predetermined set of signal values may be calculated based on a mathematical simulation that mimics the function of a manufactured lightwave circuit 200. The predetermined set of signal values, however, is preferably determined by connecting a tunable, monochromatic light source, as a test input optical signal, to the second optical input 220 of a manufactured lightwave circuit 200 included in monitor 40. The response of optical detectors 240, 250, 260 are measured as the wavelength of the test input optical signal is varied. The test input optical signal preferably has a known constant power. The measured powers are preferably normalized by, for example, summing the responses into a total output optical signal power and dividing each response by this output optical signal power or by dividing the measured powers by the known power of the test input optical signal.

The normalized responses may be stored as a predetermined set of signal values and then matched with the electrical output optical signals corresponding to the first, second and third output optical signals. The comparison of the predetermined set of signal values with the powers corresponding to the electrical output optical signals and the determination of the wavelength from the comparison may be made manually or otherwise. The monitor 40 includes a means for comparing the electrical output signals to the predetermined set of signal values and a means for determining the wavelength of the input optical signals from the comparison. These means may be software implemented using a programmable computer, microprocessor, microcontroller, or the like.

The predetermined set of signal values may be stored on any computer readable medium, such as a floppy diskette, hard drive, CD-ROM or programmable ROM. For example, the predetermined set of signal values could be generated as a part of the manufacturing process and stored in the ROM of a microcontroller for use in monitor 40. Such a microcontroller may have its own A/D converters as well as adequate ROM storage for the comparison and determination software. The same microcontroller could also be used to control and interact with a laser 30 being monitored by monitor 40.

After the electrical output optical signals are generated, they may be converted to digital signals by an analog to digital (A/D) converter. These converted signals represent the power of the output optical signals detected by the output optical detectors 240, 250, 260 and may also be normalized to facilitate comparison with the predetermined set of signal values. These signals may be normalized by, for example, summing the powers measured at optical detectors 240, 250, 260 into a total output optical power and dividing each measured output optical power by the total output optical power.

It may occur, due to limited prior sampling in generating the predetermined set of signal values, that a comparison is best achieved by interpolating from the best fits to the normalized stored responses. Of course, an unknown input optical signal could be measured before this predetermined set of signal values is generated. Further, the computer implemented means for comparing and determining the wavelength may be remote from the actual lightwave circuit 200. The electrical signals corresponding to the powers of the output optical signals could, for example, be transmitted to a central computer that determines the wavelength of the input optical signal. In this manner, one or more central computers may be used to determine a plurality of wavelengths of input optical signals from an input optical transmitter system 20.

The sum of the detected output optical signals may be taken to determine the power in the measured signal. In a input optical transmitter system 20, the sum will be a known percentage of the actual power of an optical signal generated by laser 30 because only a portion of the signal generated by laser 30 is tapped to be examined by monitor 40. The actual portion or percentage of the signal tapped can be determined from the tap ratio of the tap used in the system 20.

Figure 3:
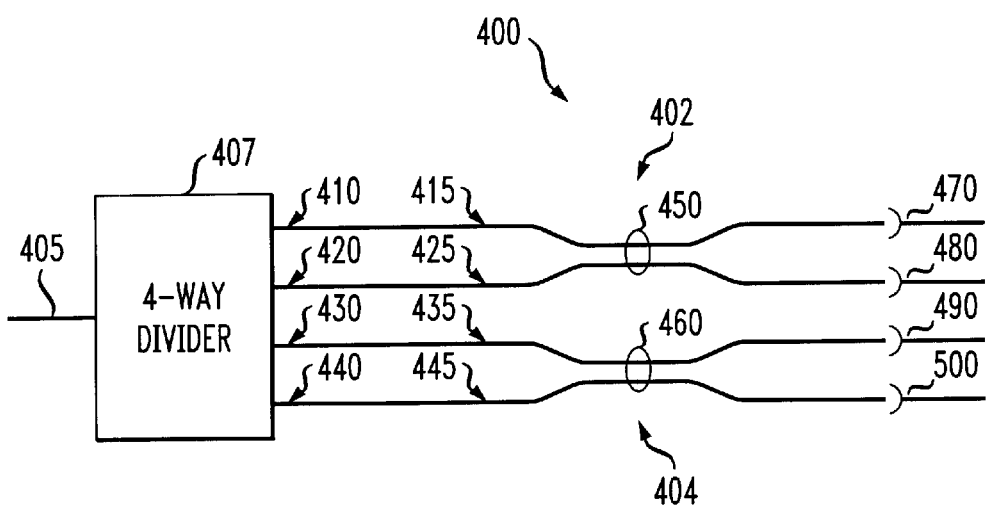
FIG. 3 is a diagram of an exemplary lightwave circuit having four optical outputs according to the present invention.

FIG. 3 is a diagram of another exemplary embodiment of a lightwave circuit 400 that may be included in an apparatus, such as monitor 40 (FIG. 1), for determining the wavelength and power of an input optical signal. An input optical signal may be inputted into input 405 of four-way divider section 407 wherein the input optical signal is divided into approximately four equally strong individual optical signals that are outputted from four-way divider 407 at first divider output 410, second divider output 420, third divider output 430, and fourth divider output 440. First divider output 410, second divider output 420, third divider output 430, and fourth divider output 440 may be connected to first optical path 415, second optical path 425, third optical path 435, and fourth optical path 445, respectively. First and second optical paths 415, 425 are coupled at first output coupler 450, and third and fourth optical paths 435, 445 are coupled at second output coupler 460. Optical detectors 470, 480 are disposed to detect a first output optical signal and a second output optical signal, respectively, from output optical coupler 450. Optical detectors 490, 500 are disposed to detect a third output optical signal and a fourth output optical signal, respectively, from output optical coupler 460.

Figure 8:
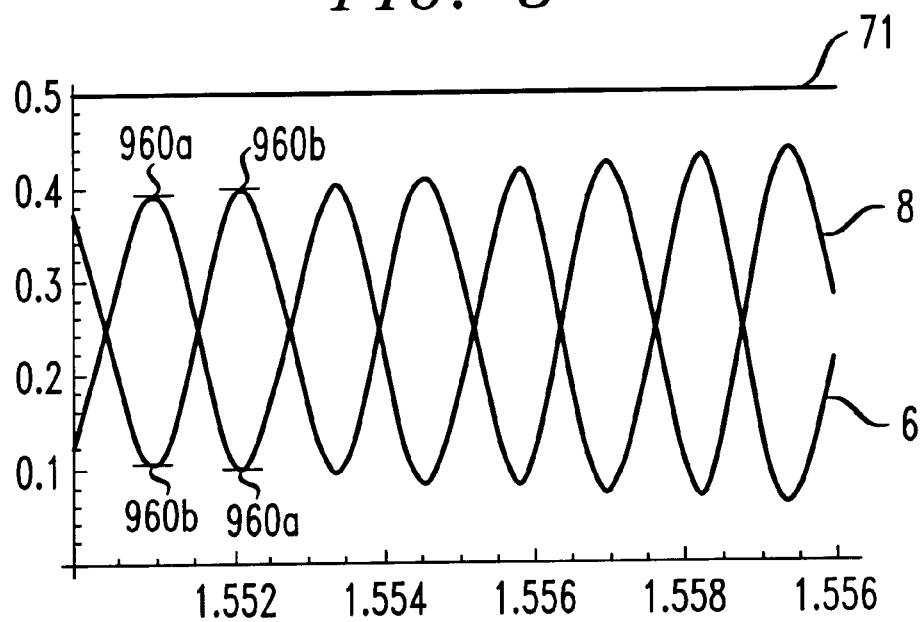
FIG. 8 is a graph of the powers of the outputs from the simulated upper section of the lightwave circuit of FIG. 3 as the wavelength of the input optical signal changes.
Figure 9:
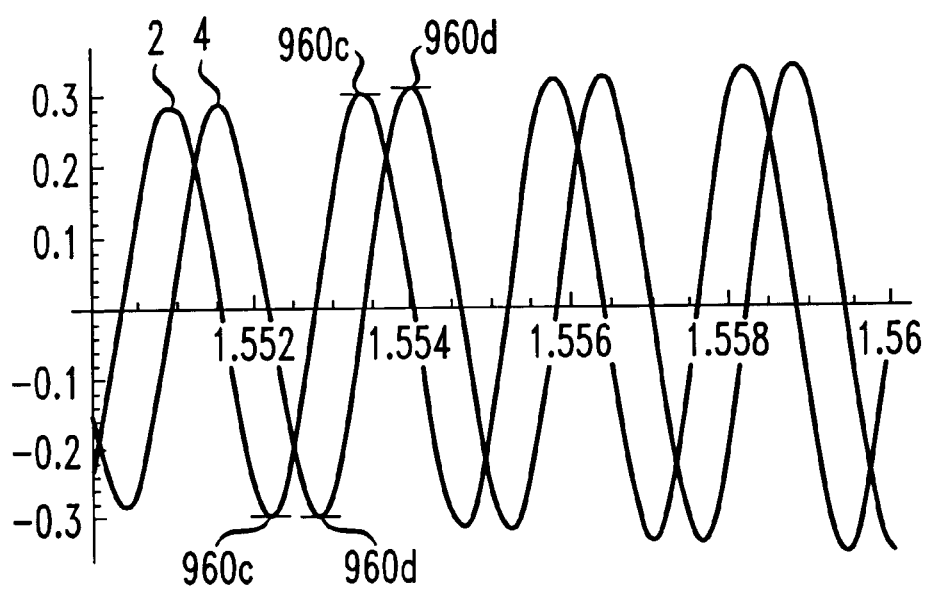
FIG. 9 is a graph of the difference responses of the powers of the outputs of the simulated lightwave circuit of FIG. 3 as the wavelength of the input optical signal changes.
Figure 10:
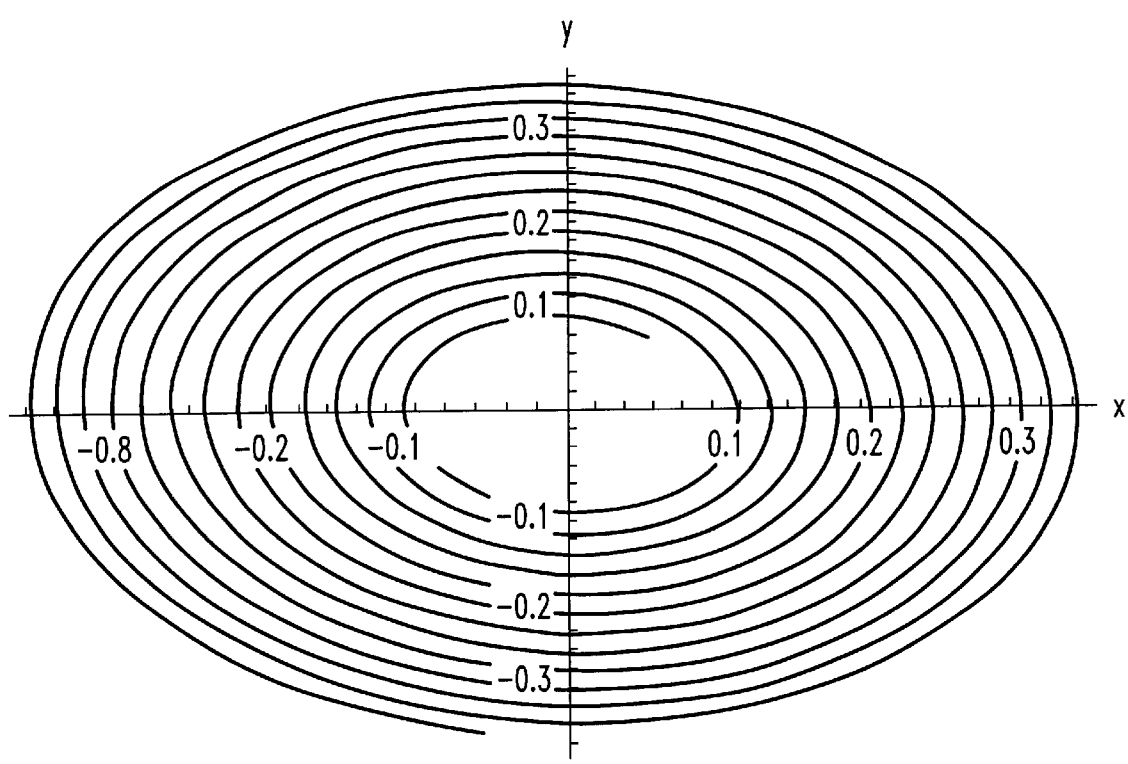
FIG. 10 is a graph of the simulated difference responses of the lightwave circuit of FIG. 3 plotted against each other over a range of wavelengths for an input optical signal.

The difference in length between first optical path 415 and second optical path 425 is preferably several hundred to thousands of wavelengths. The upper section 402 of the lightwave circuit 400 and lower section 404 of the lightwave circuit 400 are similarly constructed with the exception that the difference in optical path length between the first optical path 415 and second optical path 425 differs slightly from the difference in optical path length between the third optical path 435 and fourth optical path 445. In a simulation of the lightwave circuit 400, the difference in optical path length between first optical path 410 and second optical path 420 is 1000 um, and the difference in optical path lengths between the third optical path 430 and fourth optical path 440 is 1000.4 um. FIG. 8, FIG. 9, and FIG. 10 illustrate the calculated output optical signals in a mathematical simulation of lightwave circuit 400.

FIG. 8 is a graph of the calculated output powers of output optical signals measured at first optical detector 470 and second optical detector 480 of lightwave circuit 400 as the wavelength of the input optical signal changes. The power 6 of first output optical signal and the power 8 of second output optical signal show a ripple dependence on the wavelength of the input optical signal. The ripple dependence apparent in powers 6,8 is the result of the interference between first individual optical signal and second individual optical signal occurring within output coupler 450 after the first individual optical signal and second individual optical signal propagate through optical paths of different lengths, namely first optical path 415 and second optical path 425. The sum 7 of the two responses is constant at 0.5. This occurs because half of the power of the input optical signal is directed to the upper section 402 of the lightwave circuit 400 and half of the input optical signal power is directed to the lower section 404 of lightwave circuit 400. For illustrative purposes, the simulation ignores losses due to scattering or other forms of loss within the lightwave circuit 400. FIG. 8 also shows that first output coupler 450 has slow wavelength dependent characteristics as shown by the variation of the peak amplitudes 960$a$, 960$b$ of the powers 6,8 as the wavelength of the input optical signal increases. Similar responses are expected from the powers (not shown) of the third and fourth output optical signals as the wavelength of the input optical signal varies.

FIG. 9 is a graph of the calculated difference responses of the outputs of the lightwave circuit 400. The first difference response 2 represents the difference of the power 6 of the first output optical signal and the power 8 of the second output optical signal over a range of wavelengths for the input optical signal. The second difference response 4 represents the difference of the power of the third output optical signal and the power of the fourth output optical signal over a range of wavelengths. The difference responses 2,4 are approximately 90 degrees out of step because of the 0.4 um or approximately ¼ wavelength difference between the difference in path lengths of the first optical path 415 and second optical path 425 and of the third optical path 435 and fourth optical path 445. The difference responses 2,4 show that the peak amplitudes 960c, 960d of the ripple dependency for both difference responses 2,4 slowly change with wavelength because of the slow wavelength dependency of the first coupler 450 and second coupler 460.

FIG. 10 is a graph of the simulated difference responses 2,4 of the lightwave circuit 400 plotted against each other over a range of wavelengths from 1.53 um to 1.56 um for the input optical signal. In FIG. 10, the first difference response is plotted on the X-axis, and the second difference response is plotted on the Y-axis. The resulting spiral formation demonstrates that the total number of discernible wavelength values increases considerably by using four detectors 470, 480, 490, 500 and that the change in the peak amplitude of the powers of the output optical signals varies monotonically over this range. For at least the range of wavelengths chosen for the simulation, the spiral formation does not intersect itself. Were the spiral formation to intersect itself, there would be an ambiguity in the wavelength of the input optical signal because the powers of the output optical signals corresponding to the intersection point would represent more than one wavelength for the input optical signal. In that situation, it could be determined that, at best, the input optical signal has one of two wavelengths.

Figure 4A:
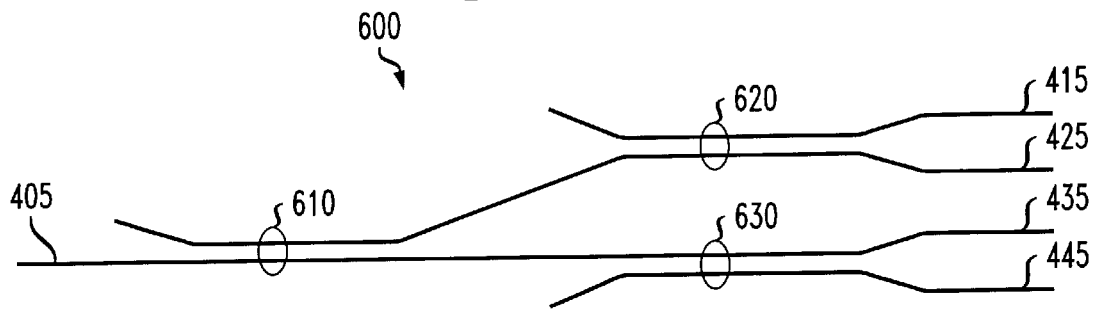
FIG. 4A is a diagram of a directional coupler embodiment of the four-way divider section shown in FIG. 3.
Figure 4B:
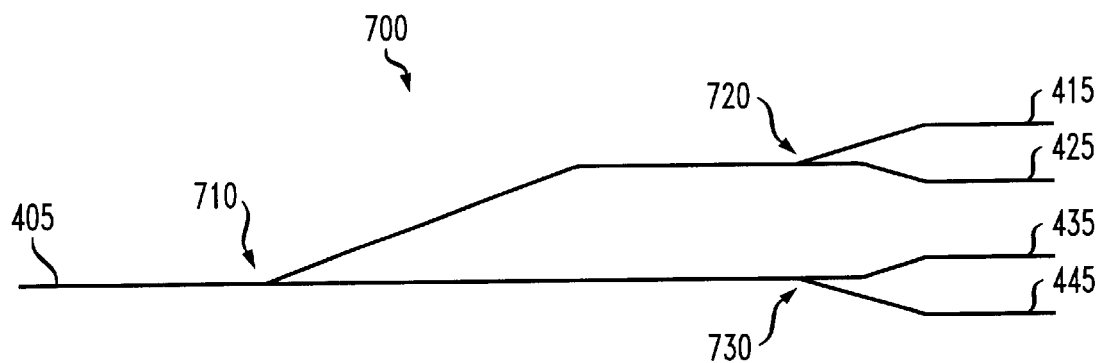
FIG. 4B is a diagram of a Y-junction embodiment of the four-way divider section shown in FIG. 3.
Figure 4C:
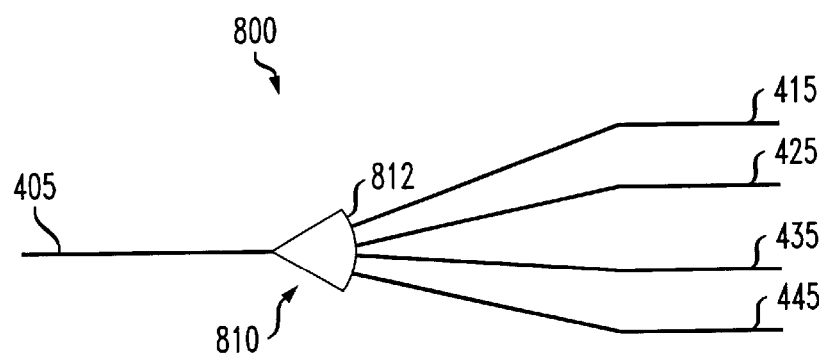
FIG. 4C is a diagram of a star coupler embodiment of the four-way divider section shown in FIG. 3.

FIGS. 4A, 4B, and 4C are diagrammatical representations of exemplary embodiments of the four-way divider 407. FIG. 4A shows the use of a first directional coupler 610, a second directional coupler 620, and a third directional coupler 630 in lightwave circuit 600 to divide an input optical signal entering input 405 of lightwave circuit 400 into four individual optical signals. The first directional coupler 610 splits an input optical signal into a pair of approximately equal intermediate signals. The second directional coupler 620 and third directional coupler 630 split each of the intermediate signals again in half. An input optical signal is thereby divided into approximately four equal individual optical signals each having approximately a quarter of the power of the input optical signal. The four individual optical signals are directed to first optical path 415, second optical path 425, third optical path 435, and fourth optical path 445. A lightwave circuit 600 as depicted in FIG. 4A allows for gentle transitions between the directional couplers 610, 620, 630 (i.e., gradual bends in the lightwave circuitry), so that there is very little loss in the signals due to absorption or scattering. The lightwave circuit does require significant area on a planar waveguide circuit and there may be difficulties in fabrication in controlling the ratio of light splitting to the preferred 50% to 50% splits.

FIG. 4B is a diagram of a Y-junction embodiment of the four-way divider section 407. Lightwave circuit 700 also utilizes a succession of 50% to 50% dividers, namely first Y-junction 710, second Y-junction 720, and third Y-junction 730. Y-junction 720 and Y-junction 730 lead to optical paths 415, 425 and optical paths 435, 445, respectively. Y-junction dividers may be made symmetrically or asymmetrically and are less likely to show a marked wavelength dependence. Y-junctions are also less susceptible to processing variations and require less area on a planar waveguide circuit than directional couplers. Y-junctions do, however, suffer from higher excess losses since there is a greater likelihood of light scattering at the junction regions.

FIG. 4C is a diagram of a star coupler embodiment of the four-way divider section 407. Region 810 of lightwave circuit 800 may be constructed in a manner similar to that used for N×M star couplers used in Dragone Routers. Region 810 is doped to confine the light to a narrow planar region that is parallel to the major surfaces of a substrate containing region 810, but region 810 is not made as narrow as the channels used for waveguides themselves. Thus, light from the input waveguide 405 entering region 810 will spread out laterally in region 810. This spreading light will reach output waveguides connected to the first optical path 415, second optical path 425, third optical path 435, and fourth optical path 445 so that each of these output guides will receive a comparable portion of the light. By making region 810 fairly small so that the width of its output edge 812 is approximately equal to the combined width of the waveguides leaving region 810, excess loss is limited and most of the input light signal will be captured by the output guides. The lightwave circuit 800 required very little area on a planar waveguide circuit, but generally has more excess loss than lightwave circuit 600 and lightwave circuit 700.

The embodiments of the four-way divider section 407 shown in FIGS. 4A, 4B and 4C are not the only possible embodiments. For example, a succession of taps or splitters with, for example, 50% power or less in any arm may be used. A first tap may remove 25% of the power of an input optical signal, a second tap may remove 33% of the remaining power, and finally the remaining power may be split between two signals. This embodiment would succeed in dividing an input optical signal into approximately four equal individual optical signals.

Returning to FIG. 3, the wavelength of an input optical signal entering lightwave circuit 400 may be determined by using the power of the output optical signals detected at the first optical detector 470, second optical detector 480, third optical detector 490, and fourth optical detector 500 in a manner similar to that for lightwave circuit 200. Optical detectors 470, 480, 490, 500 are preferably photodetectors, and the photodetectors 470, 480, 490, 500 convert the output optical signal into electrical signals corresponding to the power of the first, second, third and fourth output optical signals. The electrical output signals may then be compared to a predetermined set of signal values. This set of signal values may be calculated based on a mathematical simulation. The predetermined set of signal values, however, is preferably determined by connecting a tunable, monochromatic light source, as a test input optical signal, to input 405 of the lightwave circuit 400. The powers signals detected at optical detectors 470, 480, 490, 500 are measured as the wavelength is varied for the test input optical signal that preferably has a known input power. The responses may be normalized by, for example, summing the responses into a total output optical signal power and dividing the power of each measured response by this output optical signal power or by dividing the power of each measured response by the known power of the test input optical signal.

The normalized responses may be stored as a predetermined set of signal values and then matched with the electrical output optical signals corresponding to the first, second and third output optical signals. The comparison of the predetermined set of signal values with the powers corresponding to the electrical output optical signals and the determination of the wavelength from the comparison may be made manually or otherwise. The monitor 40 includes a means for comparing the electrical output signals to the predetermined set of signal values and a means for determining the wavelength of the input optical signals from the comparison. These means are preferably software implemented using a programmable computer, microprocessor, microcontroller or the like. The predetermined set of signal values may be stored on any computer readable medium, such as a floppy diskette, hard drive, CD-ROM or programmable ROM. The electrical output optical signals may be converted to digital signals by an analog to digital (A/D) converter. These converted signals represent the power of the output optical signals detected by the output optical detectors 470, 480, 490, 500 and may also be normalized to facilitate comparison with the predetermined set of signal values. It may occur, due to limited prior sampling in generating the predetermined set of signal values, that a comparison is best achieved by interpolating from the best fits to the normalized stored responses. Of course, an unknown input optical signal could be measured and then the predetermined set of signal values could be generated. All four electrical output signals may be compared with the predetermined set of signal values, but a comparison may also be made using just the electrical output signals of the upper section 402 or lower section 404 of the lightwave circuit 400.

The sum of the detected output optical signals may be used to determine the power input optical signal. In an input optical transmitter system 20, the sum will be a known percentage of the actual power of an optical signal generated by a laser 30 because only a portion of the signal is tapped to be examined by monitor 30. The actual portion or percentage of the signal tapped can be determined from the rating of the tap used in the system 20.

It is recommended that the linear response of the outputs of lightwave circuit 200 and lightwave circuit 400 be confirmed prior to generating a predetermined set of signal values. To verify that each output has a linear response to changes in the power of the input optical signal, a light source with controllable output power may be connected to the input of lightwave circuit 200 or lightwave circuit 400. By varying the power of the input optical signal, it may be confirmed that the response of each output linearly follows the power of the input optical signal. This linear response test also helps determine if one or more of the output responses are weak or non-existent, such as may occur if an optical or electrical connection is broken.

The generation of the predetermined set of signal values for a monitor 40 that includes a lightwave circuit such as lightwave circuit 200 or lightwave circuit 400 obviates the need for stringent manufacturing control. Variations in construction from monitor to monitor may be accounted for by generating the predetermined set of signal values specifically for each individual monitor 40. The predetermined set of signal values also accounts for any photodetector response that varies with wavelength.

The preferred embodiment of the lightwave circuits 200, 400 is to construct the lightwave circuit as a planar waveguide circuit, e.g., as transparent waveguides fabricated on a suitable substrate such as glass or silicon. The lightwave circuits 200, 400 may, however, be made from fused fibers and splices. It should be noted that it is desirable to control the temperature and polarization of a system including a planar waveguide circuit in order to help alleviate problems associated with birefringence and temperature dependence of the circuits. The behavior of coupler often depends upon the polarization of the optical signal. The optical path lengths of waveguides on a substrate also depends upon polarization. When monitoring a laser of specific polarization, therefore, the predetermined set of signal values should be generated using a test input optical signal having the same polarization.

As explained in the above-described embodiments, there is no ambiguity of wavelength and power for an input optical signal over the range of wavelengths where the peak amplitude of each of the powers of the output optical signals depends monotonically on the wavelength of the input optical signal. A monitor 40 exhibiting this monotonic characteristic for a range of wavelengths may therefore be used to monitor lasers 30 designed to operate within that range of wavelengths. The monotonic range may be controlled in order to design monitors 40 to monitor lasers of different wavelengths than those described in the above simulations because the coupling of individual optical signals within optical couplers, such as optical couplers 300, 310, 450, and 460, is wavelength dependent. The monotonic range may, therefore, be changed by varying the length of the coupling section and/or separation distance between the waveguides of the couplers. For example, optical couplers having longer coupling sections exhibit a stronger wavelength dependence.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A method of determining the wavelength and power of an input optical signal, comprising the steps of:
   (a) dividing said input optical signal into a plurality of individual optical signals;
   (b) inducing said individual optical signals to interfere with each other to form a plurality of output optical signals, such that the powers of said output optical signals have a ripple dependence on the wavelength of said input optical signal, the peak amplitude of each of the powers depending monotonically on the wavelength of said input optical signal over a range of wavelengths to be monitored for said input optical signal;
   (c) detecting said output optical signals and producing a plurality of electrical output signals, said electrical output signals corresponding to the power of each output optical signal, respectively;
   (d) comparing said electrical output signals to a predetermined set of signal values; and
   (e) determining the wavelength of said input optical signal from said comparison.

2. The method of claim 1, wherein the step of dividing said input optical signal includes dividing said input optical signal into at least three individual optical signals.

3. The method of claim 1, wherein the step of dividing said input optical signal includes the step of dividing said input optical signal with at least one multiple channel waveguide coupler.

4. The method of claim 1, wherein the step of dividing said input optical signal includes the step of dividing said input optical signal with at least one directional coupler.

5. The method of claim 1, wherein the step of dividing said input optical signal includes the step of dividing said input optical signal with at least one Y-channel divider.

6. The method of claim 1, wherein the step of dividing said input optical signal includes the step of dividing said input optical signal with at least one star coupler.

7. The method of claim 1, further comprising the step of varying a test input signal over a range of wavelengths to generate said predetermined set of signal values.

8. The method of claim 1, further comprising the step of normalizing said predetermined set of signal values.

9. The method of claim 1, further comprising the step of normalizing said electrical output signals prior to comparing said electrical output signals to said predetermined set of signal values.

10. The method of claim 9, wherein the step of normalizing said electrical output signals includes summing the powers corresponding to said electrical output signals into a total output optical signal power and dividing each of the powers corresponding to said electrical output signals by said total output optical signal power.

11. The method of claim 1, further comprising the step of propagating said individual optical signals through at least one coupling section characterized by a slow wavelength dependence to induce the peak amplitude of each of the powers to depend monotonically on the wavelength of said input optical signal over a range of wavelengths to be monitored for said input optical signal.

12. The method of claim 1, wherein the step of inducing said individual optical signals to interfere with each other to form output optical signals includes the step of propagating said individual optical signals through individual optical paths of different optical path lengths and coupling said input optical signals together after said individual optical signals propagate through said individual optical paths.

13. The method of claim 1, wherein the step of detecting said output optical signals includes the step of detecting said output optical signals with a plurality of photodetectors.

14. The method of claim 1, wherein the peak amplitude of each of the powers has an oscillatory dependence on the wavelength of said input optical signal over a range of wavelengths of said input optical signal.

15. The method of claim 14, wherein the period of said peak amplitude oscillatory dependence is greater than the period of said ripple dependence.

16. The method of claim 1, wherein said ripple dependence of the powers of said output optical signals is approximately sinusoidal.

17. The method of claim 1, wherein the step of comparing said electrical output signals to said predetermined set of signal values includes the step of interpolating said electrical output signals to said predetermined set of signal values.

18. An apparatus for determining the wavelength of an input optical signal, comprising:

(a) at least one optical signal divider for dividing said input optical signal into a plurality of individual optical signals;

(b) a plurality of optical paths having different optical path lengths disposed such that said individual optical signals propagate through said optical paths;

(c) at least one output coupler, said output coupler accepting a plurality of said individual optical signals after said individual optical signals propagate through said optical paths and permitting said individual optical signals to interfere with each other to form a plurality of output optical signals, the powers of said output optical signals having a ripple dependence on the wavelength of said input optical signal;

(d) at least one slow wavelength dependent coupler, said slow wavelength dependent coupler causing the peak amplitude of each of the powers to depend monotonically on the wavelength of said input optical signal over a range of wavelengths to be monitored for said input optical signal;

(e) a plurality of optical detectors, said optical detectors disposed to detect said output optical signals, said optical detectors producing a plurality of electrical output signals corresponding to the power of each output optical signal, respectively;

(f) means for comparing said electrical output signals to a predetermined set of signal values; and (g) means for determining the wavelength of said input optical signal from said comparison.

19. The apparatus of claim 18, wherein said apparatus includes at least one optical signal divider that is a multiple channel waveguide coupler.

20. The apparatus of claim 18, wherein said apparatus includes at least one optical signal divider that is a directional coupler.

21. The apparatus of claim 18, wherein said apparatus includes at least one optical signal divider that is a Y-channel divider.

22. The apparatus of claim 18, wherein said apparatus includes at least one optical signal divider that is a star coupler.

23. The apparatus of claim 18, wherein said predetermined set of signal values is determined by varying a test input signal over a range of wavelengths.

24. The apparatus of claim 18, wherein said predetermined set of signal values is normalized.

25. The apparatus of claim 18, further comprising a means for normalizing said electrical output signals.

26. The apparatus of claim 25, wherein said means for normalizing said electrical output signals sums the powers represented by said electrical output signals into a total output optical signal power and divides each of the powers represented by said electrical output signals by said total output optical signal power.

27. The apparatus of claim 18, wherein said optical detectors are photodetectors.

28. The apparatus of claim 18, wherein the peak amplitude of each of the powers has an oscillatory dependence on the wavelength of said input optical signal.

29. The apparatus of claim 28, wherein the period of the peak amplitude of each of the powers is greater than the period of said ripple dependence of the powers.

30. The apparatus of claim 18, wherein said ripple dependence is substantially sinusoidal.

31. The apparatus of claim 18, wherein said apparatus further comprises a planar waveguide circuit, said planar waveguide circuit including said optical signal divider, said optical paths, said output coupler, and said slow wavelength dependent coupler.

32. An optical transmitter system, comprising:

a plurality of optical lasers, said optical lasers generating optical signals;

a plurality of modulators, said modulators modulating said optical signals with input data to produce modulated optical signals;

at least one multiplexer producing a multiplexed optical signal from said modulated optical signals; and a plurality of optical monitors for determining the wavelength of said optical signals, each of said monitors accepting an input optical signal, said input optical signal comprising at least a portion of at least one of said optical signals, said optical monitors comprising, (a) at least one optical signal divider for dividing said input optical signal into a plurality of individual optical signals;
(b) a plurality of optical paths having different optical path lengths disposed such that said individual optical signals propagate through said optical paths;
(c) at least one output coupler, said output coupler accepting a plurality of said individual optical signals after said individual optical signals propagate through said optical paths and permitting said individual optical signals to interfere with each other to form a plurality of output optical signals, the powers of said output optical signals having a ripple dependence on the wavelength of said input optical signal;
(d) at least one slow wavelength dependent coupler, said slow wavelength dependent coupler causing the peak amplitude of each of the powers to depend monotonically on the wavelength of said input optical signal over a range of wavelengths to be monitored for said input optical signal;
(e) a plurality of optical detectors, said optical detectors disposed to detect said output optical signals, said optical detectors producing a plurality of electrical output signals corresponding to the power of each output optical signal, respectively;
(f) means for comparing said electrical output signals to a predetermined set of signal values; and
(g) means for determining the wavelength of said input optical signal from said comparison.

33. The system of claim 32, wherein said optical monitors are disposed to monitor said optical signals before said input optical signals are modulated.

34. The system of claim 32, further comprising a plurality of taps, said taps disposed to direct said portion of each of said optical signals into said monitors.

\* \* \* \* \*

UNITED STATES PATENT AND TRADEMARK OFFICE
CERTIFICATE OF CORRECTION

PATENT NO. : 6,577,399 B1
DATED : June 10, 2003
INVENTOR(S) : Bergmann et al.

It is certified that error appears in the above-identified patent and that said Letters Patent is hereby corrected as shown below:

<u>Title page,</u>
Item [73], Assignee, should read as follows:
-- Triquint Technology Holding Co., Hillsboro, OR (US). --

Signed and Sealed this

Twenty-third Day of September, 2003

JAMES E. ROGAN
*Director of the United States Patent and Trademark Office*